(12) United States Patent
Hannu et al.

(10) Patent No.: US 9,351,132 B2
(45) Date of Patent: May 24, 2016

(54) EVENT NOTIFICATION IN A HALF DUPLEX COMMUNICATION ENVIRONMENT

(75) Inventors: Hans Hannu, Luleå (SE); Tomas Jönsson, Luleå (SE); Per Synnergren, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1592 days.

(21) Appl. No.: 12/097,195

(22) PCT Filed: Dec. 15, 2005

(86) PCT No.: PCT/SE2005/001925
§ 371 (c)(1),
(2), (4) Date: Jun. 12, 2008

(87) PCT Pub. No.: WO2007/069949
PCT Pub. Date: Jun. 21, 2007

(65) Prior Publication Data
US 2008/0298308 A1 Dec. 4, 2008

(51) Int. Cl.
*H04W 68/00* (2009.01)
*H04W 4/10* (2009.01)
*H04W 76/00* (2009.01)
*H04W 84/04* (2009.01)
*H04W 84/18* (2009.01)

(52) U.S. Cl.
CPC .............. *H04W 4/10* (2013.01); *H04W 76/005* (2013.01); *H04W 68/00* (2013.01); *H04W 84/04* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 6,473,398 B1 * | 10/2002 | Wall et al. | 370/229 |
| 6,930,984 B1 * | 8/2005 | Nomura et al. | 370/254 |
| 7,525,919 B2 * | 4/2009 | Matsui et al. | 370/238 |
| 7,782,786 B1 * | 8/2010 | Natarajan et al. | 370/244 |
| 2005/0232162 A1 * | 10/2005 | Chen et al. | 370/252 |
| 2006/0067335 A1 * | 3/2006 | Maya et al. | 370/397 |
| 2006/0075093 A1 * | 4/2006 | Frattura et al. | 709/224 |
| 2006/0167891 A1 * | 7/2006 | Blaisdell et al. | 707/10 |
| 2007/0297390 A1 * | 12/2007 | Skog et al. | 370/352 |

* cited by examiner

*Primary Examiner* — Fan Ng

(57) ABSTRACT

The present invention is directed towards providing event-triggered communication in a half duplex communication environment of a wireless communication network (10). A first end terminal (12) sends a selection of an end terminal (14) in a group of terminals to act as an event notifying device to a server (22). The event notifying device (14) compares an event with a threshold and sends an event notifier to the server if the event exceeds the threshold. If it receives the event notifier, the server prioritises data from the event notifying device over ongoing communication sessions for other devices in the group, receives data from the event notifying device associated with the event notifier and transports data indicative of the event to other devices of the group, in order to inform them of the event.

18 Claims, 5 Drawing Sheets

EVENT NOTIFICATION IN A HALF DUPLEX COMMUNICATION ENVIRONMENT

TECHNICAL FIELD OF THE INVENTION

The present invention relates to methods and computer program products for providing event-triggered communication in a half duplex communication environment of a wireless communication network as well as end terminals and a server provided in such an environment.

DESCRIPTION OF RELATED ART

There has in the recent years evolved the provision of walkie-talkie communication in a cellular network environment. One example of this is the standard push-to-talk-over-cellular (PoC), which allows the users of cellular phones to engage in push-to-talk sessions using their cellular phones. In order to provide such one-way communication a user of a terminal typically presses a button. The terminal is then granted "floor control" or the right to send data by a push-to-talk server, whereupon speech or other data may be transmitted at half duplex from the terminal to one or more other terminals. The user of the end terminal only has to press a button for this to happen.

There do furthermore exist different devices that are activated by an event, like baby-watchers that are voice activated. Voice activation is today provided as a VOX (Voice Activity Operation) that exists in relation to walkie-talkies. These devices are however separate from cellular devices and cellular networks.

VOX does also exist in cordless networks, like DECT. Philips does for instance have a product Zenia 200 Vox, which automatically calls a programmed number when being voice activated.

There also exist alarm solutions where upon the detection of an event, like the detection of movement, an SMS and/or MMS is sent with a picture towards a pre-defined user.

It would therefore be of interest to provide event-triggered communication in a half duplex communication environment of a wireless communication network.

SUMMARY OF THE INVENTION

The present invention is therefore directed towards solving the problem of providing event-triggered communication in a half duplex communication environment of a wireless communication network.

This is generally solved by a first end terminal sending a selection to a server of an end terminal in a group of terminals to act as an event notifying device, comparing an event with a threshold in the event notifying device, directly sending data indicative of the event from the event notifying device to the server if the event exceeds the threshold and transporting data indicative of the event from the server to other devices of the group, in order to inform them of the event One object of the present invention is thus directed towards providing a method of providing event-triggered communication in a half duplex communication environment of a wireless communication network.

This object is according to a first aspect of the present invention achieved through a method of providing event-triggered communication in a half duplex communication environment of a wireless communication network for a group of end terminals including at least a first end terminal and a second end terminal and comprising the steps of:

receiving a selection, from the first end terminal, of an end terminal of the group to act as an event notifying device, and allowing data indicative of an event to be directly sent from the event notifying device, wherein in the case of receiving data indicative of an event from the event notifying device, further comprising the steps of prioritising data from the event notifying device over ongoing communication sessions for other end terminals of the group, and transporting data indicative of the event to other end terminals of the group, in order to inform them of the event.

This object is according to a second aspect of the present invention also achieved through a method of providing event-triggered communication in a half duplex communication environment of a wireless communication network for a group of end terminals including at least a first end terminal and a second end terminal and comprising the steps of receiving an order to be an event notifying device of the group, comparing an event with a threshold, and if the event exceeds said threshold, directly sending data indicative of the event to a half duplex communication handling server, so that the server may prioritise data indicative of the event from the event notifying device over ongoing communication sessions for other end terminals of the group, and transport data indicative of the event to other end terminals of the group for informing them of the event.

This object is according to a third aspect of the present invention also achieved through a method of providing event-triggered communication in a half duplex communication environment of a wireless communication network for a group of end terminals including at least a first end terminal and a second end terminal and comprising the steps of:

sending, to a half duplex communication handling server, a selection of an end terminal of the group to act as an event notifying device, so that the server can allow data indicative of an event to be directly sent from the event notifying device and prioritise data from the event notifying device over ongoing communication sessions for other end terminals of the group, and receive data indicative of the event from the server, in order to be informed of the event.

Another object of the present invention is directed towards providing a server, which enables event-triggered communication in a half duplex communication environment provided in a wireless communication network.

This object is according to a fourth aspect of the present invention achieved through a server providing a half duplex communication environment of a wireless communication network for a group of end terminals including at least a first end terminal and a second end terminal and comprising:

a floor control unit arranged to receive a selection, from the first end terminal, of an end terminal of the group to act as an event notifying device, allow data indicative of an event to be directly sent from the event notifying device, and being further arranged to, in case of receiving data indicative of an event from the event notifying device, prioritise data from the event notifying device over ongoing communication sessions for other end terminals of the group, and order the transporting of data indicative of the event to other end terminals of the group, in order to inform them of the event.

Another object of the present invention is directed towards providing an end terminal, which provides event-triggered communication in a half duplex communication environment of a wireless communication network.

This object is according to a fifth aspect of the present invention achieved through an end terminal provided in a half duplex communication environment of a wireless communication network for a group of end terminals including at least a first end terminal and a second end terminal and comprising a client unit arranged to:

receive an order to be an event notifying device in the group, order the comparing of an event with a threshold, and
if the event exceeds said threshold, directly order the sending of data indicative of the event to a half duplex communication handling server, so that the server may prioritise data indicative of the event from the event notifying device over ongoing communication sessions for other end terminals of the group, and transport data indicative of the event to other end terminals of the group for informing them of the event.

This object is according to a sixth aspect of the present invention also achieved through an end terminal in a half duplex communication environment of a wireless communication network for a group of end terminals including at least a first end terminal and a second end terminal and comprising a client unit arranged to:

order the sending, to a half duplex communication handling server, of a selection of an end terminal in the group to act as an event notifying device, so that the server can allow data indicative of an event to be directly sent from the event notifying device and prioritise data from the event notifying device over ongoing communication sessions for other end terminals of the group, and receive data indicative of the event from the server, in order to be informed of the event.

Still another object of the present invention is directed towards providing a computer program product, which provides event-triggered communication in a half duplex communication environment provided in a wireless communication network.

This object is according to a seventh aspect of the present invention achieved through a computer program product for providing event-triggered communication in a half duplex communication environment of a wireless communication network for a group of end terminals including at least a first end terminal and a second end terminal, comprising computer program code to make a half duplex communication handling server perform, when said code is loaded into the server:

receive a selection, from the first end terminal, of an end terminal of the group to act as an event notifying device,
allow data indicative of an event to be directly sent from the event notifying device, and in case of receiving data indicative of an event from the event notifying device, further comprising code for prioritising data from the event notifying device over ongoing communication sessions for other end terminals of the group, and order the transporting of data indicative of the event to other end terminals of the group, in order to inform them of the event.

This object is according to an eight aspect of the present invention also solved through a computer program product for providing event-triggered communication in a half duplex communication environment of a wireless communication network for a group of end terminals including at least a first end terminal and a second end terminal, comprising computer program code to make an end terminal, when said code is loaded into the end terminal:

receive an order to be an event notifying device in the group, compare an event with a threshold, and
if the event exceeds said threshold, directly order the sending of data indicative of the event to a half duplex communication handling server, so that the server may prioritise data indicative of the event from the event notifying device over ongoing communication sessions for other end terminals of the group, and transport data indicative of the event to other end terminals of the group for informing them of the event.

This object is according to a ninth aspect of the present invention furthermore solved through a computer program product for providing event-triggered communication in a half duplex communication environment of a wireless communication network for a group of end terminals including at least a first end terminal and a second end terminal, comprising computer program code to make an end terminal, when said code is loaded into the end terminal:

order the sending, to a half duplex communication handling server, of a selection of an end terminal in the group to act as an event notifying device, so that the server can allow data indicative of an event to be directly sent from the event notifying device and prioritise data from the event notifying device over ongoing communication sessions for other end terminals of the group, and receive data indicative of the event from the server, in order to be informed of the event.

The present invention has many advantages. It is possible to provide many types of applications, like baby watcher, which monitors if a baby is sleeping, car alarm and burglar alarms. Temperature, Movement and sound pressure levels may be detected. Apart from these interesting fields of application the invention has a number of other advantages. It provides fast event notification. It is flexible in that it may allow any end terminal to be set as an event notifying device. It is furthermore simple to operate for a user, since he only has to make a limited number of actions in order to activate the event notifying function. Once the function is initiated, the function can run without the user having to do anything else than observing his end terminal.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

The present invention will now be described in relation to the standard push-to-talk-over—cellular (PoC) provided in relation to a wireless cellular network. It should however be realised that the invention is not limited to push-to-talk but can be applied on any other half duplex communication environment provided in a wireless network for a group of end terminals.

Figure 1:
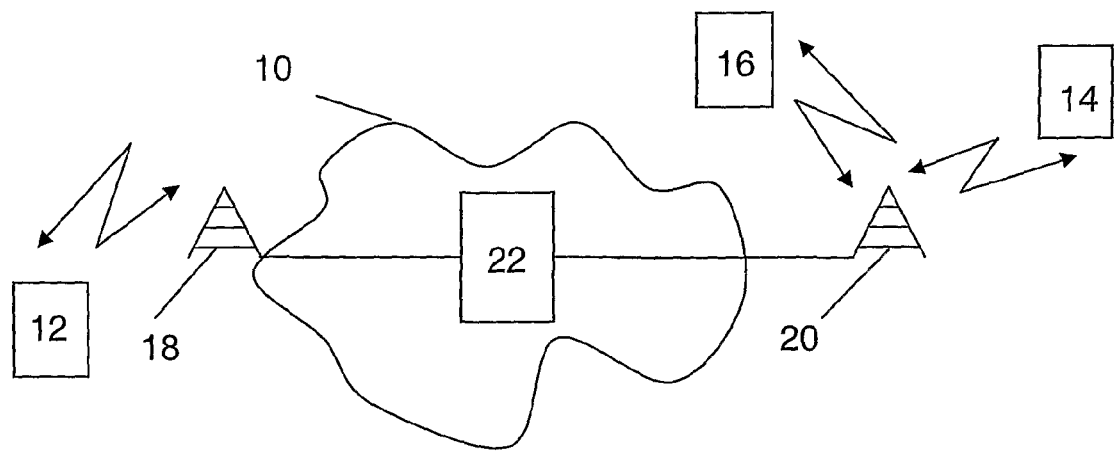
FIG. 1 schematically shows a number of end terminals connected to a push-to-talk server of a cellular network.

FIG. 1 shows a simplified wireless cellular network 10 where a first end terminal 12 communicates with a first network server 22 via a first base station 18. There is also a second terminal 14 and a third terminal 16 also communicating with the first network server 22 via a second base station 20. The server 22 is here a server operating according to the push-to-talk-over-cellular (PoC) standard. In push-to-talk, an end terminal may communicate with other end terminals by only pressing a button. The communication is furthermore provided using SIP, see "SIP: Session Initiation Protocol", Rosenberg, J. et al, IETF RFC 3261, June 2002, which is herein incorporated by reference. An end terminal is provided with a PoC client application and the server is provided with a PoC server application. The PoC client furthermore communicates with the PoC server via a so-called SIP/IP core. The end terminals 12, 14 and 16 are in the present example portable communication devices in the form of cellular phones. Likewise it should be realised that an end terminal may be any type of end terminal with wireless computer communication ability.

In the SIP core there is provided a Call Session Control Function" (CSCF) that enables IP multimedia basic SIP session handling. It has three functional roles—a "servicing CSCF" (S-CSCF), a "interrogating CSCF" (I-CSCF) and a "proxy CSCF" (P-CSCF).

The P-CSCF is the first point of contact for end terminals. An end terminal sends a register message to the P-CSCF, which looks at a URI (Uniform Resource Identifier) of this register message. It may then perform a DNS (Domain Name Service) query to discover an IP address to forward the register message to and would then get the address of the I-CSCF. The P-CSCF proxies SIP messages towards the home network for the subscriber of the end terminal. The P-CSCF may perform number internationalization, and it may enforce policies in the GGSN (gateway GPRS support node) relating to the handling of the bearer traffic for IP multimedia.

The I-CSCF is the entry point to the home network of an end terminal. The P-CSCF will use DNS (Domain Name System) to route messages to the home network, which will lead the SIP signalling to the I-CSCF. The I-CSCF then queries an HSS (Home Subscriber Server), which is an entity that keeps track of subscribers (terminals) and data relating to them like their subscriptions, like services available to an end terminal, in order to obtain information of the location of an S-CSCF server. The HSS then informs the I-CSCF that one has not been allocated. The I-CSCF then selects an S-CSCF and forwards the registration message to this S-CSCF.

The S-CSCF is a SIP proxy that provides access to the operator provided services to the end-user. The S-CSCF downloads any subscriber profile relating to the user of the end terminal or of the end terminal itself and updates location information in the HSS in order to inform it that it is the S-CSCF for that end terminal. A feature tag of a SIP invite is used in allowing the end terminal access to the server providing the service.

Here the service is PoC and handled by the server 22.

The request mentioned above includes an indication that PoC sessions are to be used. The PoC client may then engage in SIP sessions with a group of other users that are registered to the PoC server. The group may here be defined in a list, which list may be provided on the PoC server, the end terminal itself or an external server like for instance on a Wireless Village server, perhaps in the form of a buddy list. The list is preferably provided as an XML document. In PoC an end terminal may then initiate and participate in PoC sessions that are handled by the server 22. It may also be provided as a watcher, which requests presence information about other end terminals from a presence server, the presence server is here provided in the server 22, but it should be realised that it may be provided elsewhere. For an end terminal it is then possible to engage in PoC sessions with a group of other end terminals, where these may be defined in the list mentioned above. It is here possible that there are several groups provided for an end terminal, and then the end terminal may be involved in several sessions with different groups. This is described in more detail in Open Mobile Alliance, "Push to talk over Cellular (PoC)—Architecture, Candidate Version 1.0-6 Oct. 2005, which is herein incorporated by reference.

In such a session an end terminal may request to send data to other end terminals in a group. The end terminal making the request then sends a request for sending a so-called talk burst to the server. The server may then grant the sending of a talk burst according to a set of rules; this is also termed being granted the floor. The end terminal may after having been granted such sending, send the talk burst to other terminals. A talk burst is sent according to a talk burst control protocol (TBCP). Talk burst control is described in more detail in Open Mobile Alliance OMA PoC User Plane, Candidate Version 1.0, 6Oct. 2005, which is herein incorporated by reference. A talk burst, which is thus a half duplex sending of voice data in packets, can then be sent from the end terminal to other end terminals. The request, granting and sending may be done by simply pressing down a button on the end terminal. Once a talk burst is finished a talk burst release message is sent by the end terminal which the server may grant the release. This may be accomplished by stopping depressing a button on the end terminal. Also this is described in more detail in Open Mobile Alliance OMA PoC User Plane, Candidate Version 1.0, 6Oct. 2005.

According to the PoC standard there are a number of priority levels that can be set for PoC sessions, where one is pre-emptive priority, where a request to talk made by one participant of a session makes the PoC server revoke the permission to talk for another end terminal that is being active. Other priorities are high and normal. Yet another level is listen only, which allows a terminal only to listen to others and not be allowed to send data. This is described in more detail in Open Mobile Alliance, "Push to talk over Cellular (PoC)—Architecture, Candidate Version 1.0—6 Oct. 2005, chapter 8.9.

These were some of the functionalities provided in PoC network, which will be used by the present invention.

Figure 2:
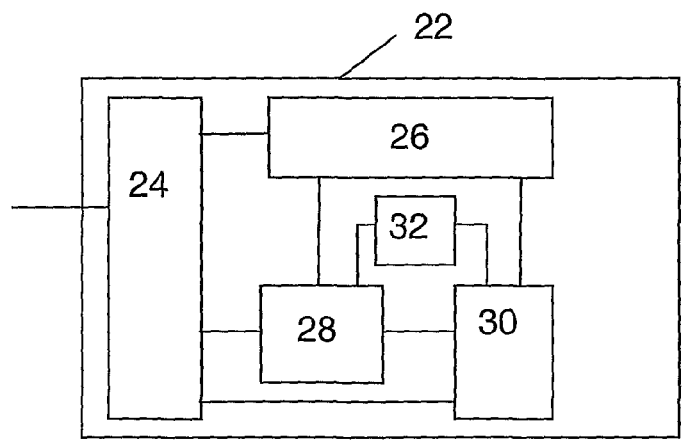
FIG. 2 shows a block schematic of different parts provided in the push-to-talk server according to the present invention.

FIG. 2 shows a block schematic of the relevant parts of the server 22. The server comprises an interface unit 24 for communication with other entities like the different end terminals 12. The interface unit 24 is connected to a basic floor control unit 28 and to an enhanced floor control unit 30 and a communication control unit 26. The floor control units 28 and 30 provide talk burst control according to the principles described above. The communication control unit 26 is connected to both the basic and enhanced floor control units 28 and 30, which are furthermore connected to each other. The two floor control units 28 and 30 are furthermore connected to a group store 32.

Figure 3:
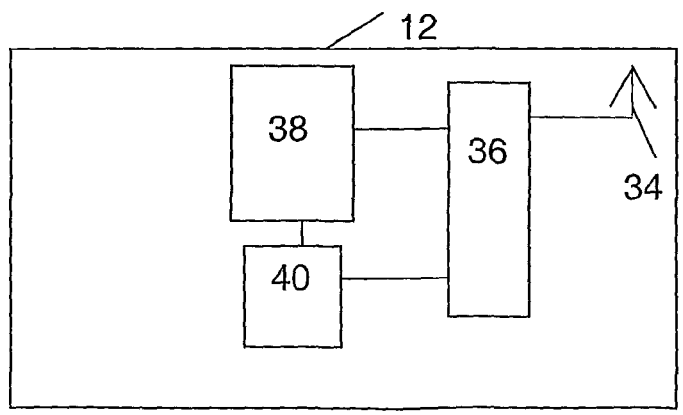
FIG. 3 shows a block schematic of different parts provided in an end terminal according to the present invention, which initiates the functionality of the present invention.

FIG. 3 shows a block schematic of the relevant parts of the first end terminal 12 for handling communication with the server 22. For this reason the first end terminal 12 is equipped with an antenna 34 connected to a second interface unit 36 for providing radio communication, for instance according to the UMTS standard. The interface unit 34 is connected to a terminal control unit 38 and to a POC client unit 40. The terminal control unit 38 has overall control of communication and functions in the end terminal, while the POC client handles POC related functions. The terminal control unit 38 and the POC client unit 40 are also connected to each other. The third end terminal 16 is equipped with the same units as the first end terminal 12.

Figure 4:
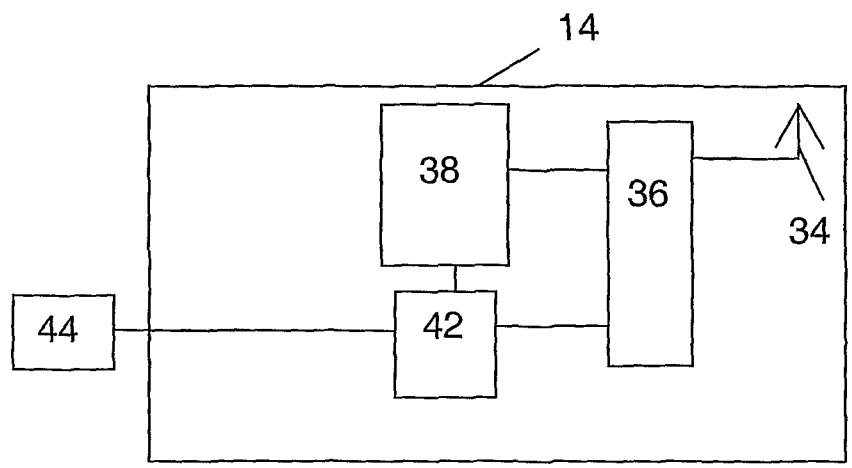
FIG. 4 shows a block schematic of different parts provided in an end terminal according to the present invention which acts as an event notifying device.

FIG. 4 shows a block schematic of the relevant parts of the second end terminal 14 for handling communication with the server 22. For this reason the second end terminal 14 is equipped with an antenna 34 connected to a second interface unit 36 for providing radio communication, for instance according to the UMTS standard. The interface unit 34 is connected to a terminal control unit 38 and to a POC client unit 42. The terminal control unit 38 has overall control of communication and functions in the end terminal, while the POC client unit 42 handles POC related functions. The terminal control unit 38 and the POC client unit 42 are also connected to each other, just as in the end terminal of FIG. 3. The second end terminal 14 is furthermore connected to an event registration unit 44, which may be a VOX (Voice Activity Operation) unit.

Figure 5:
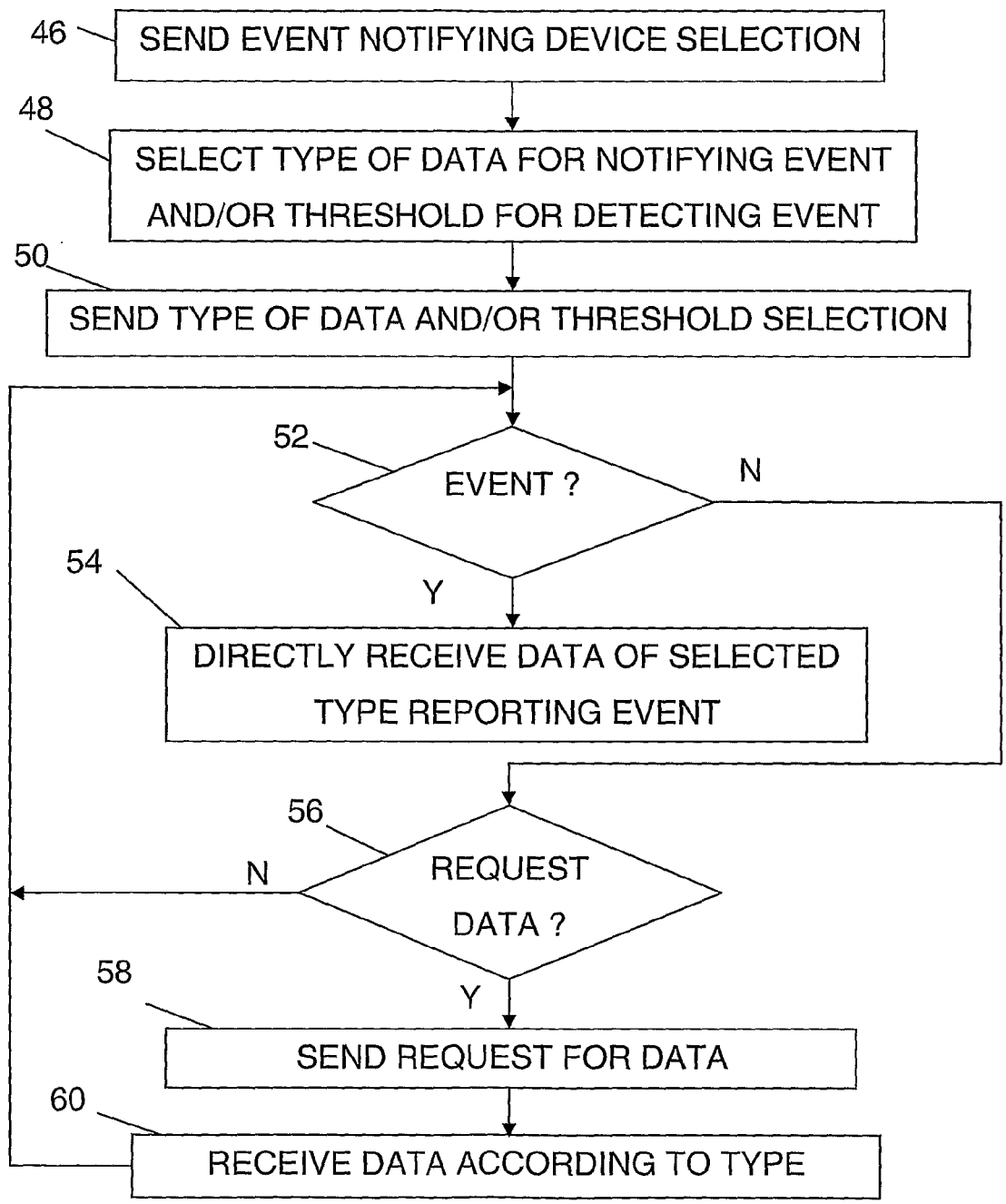
FIG. 5 shows a flow chart of a method provided in the end terminal of FIG. 3.
Figure 6:
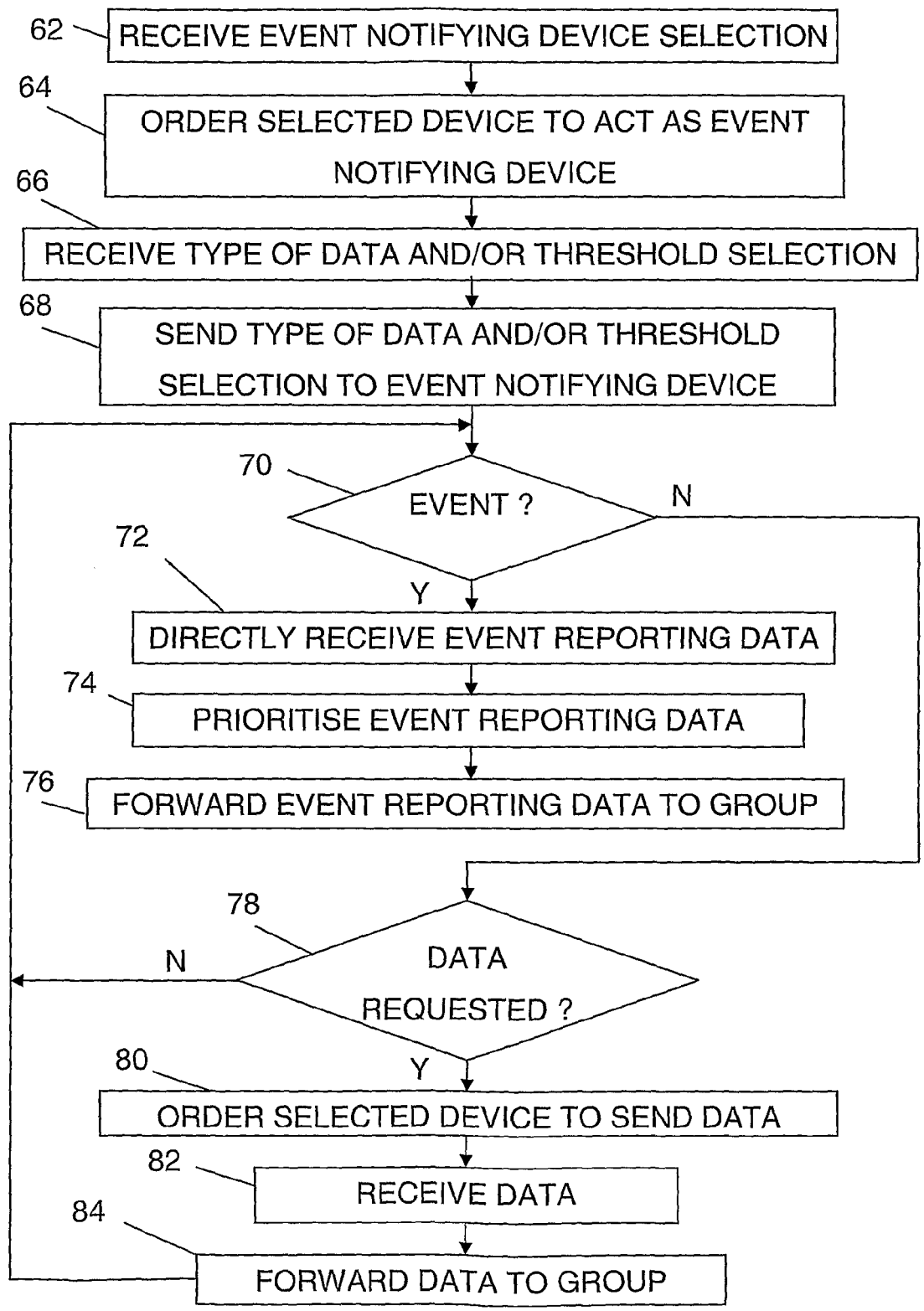
FIG. 6 shows a flow chart of a method provided in the push-to-talk server of FIG. 2.
Figure 7:
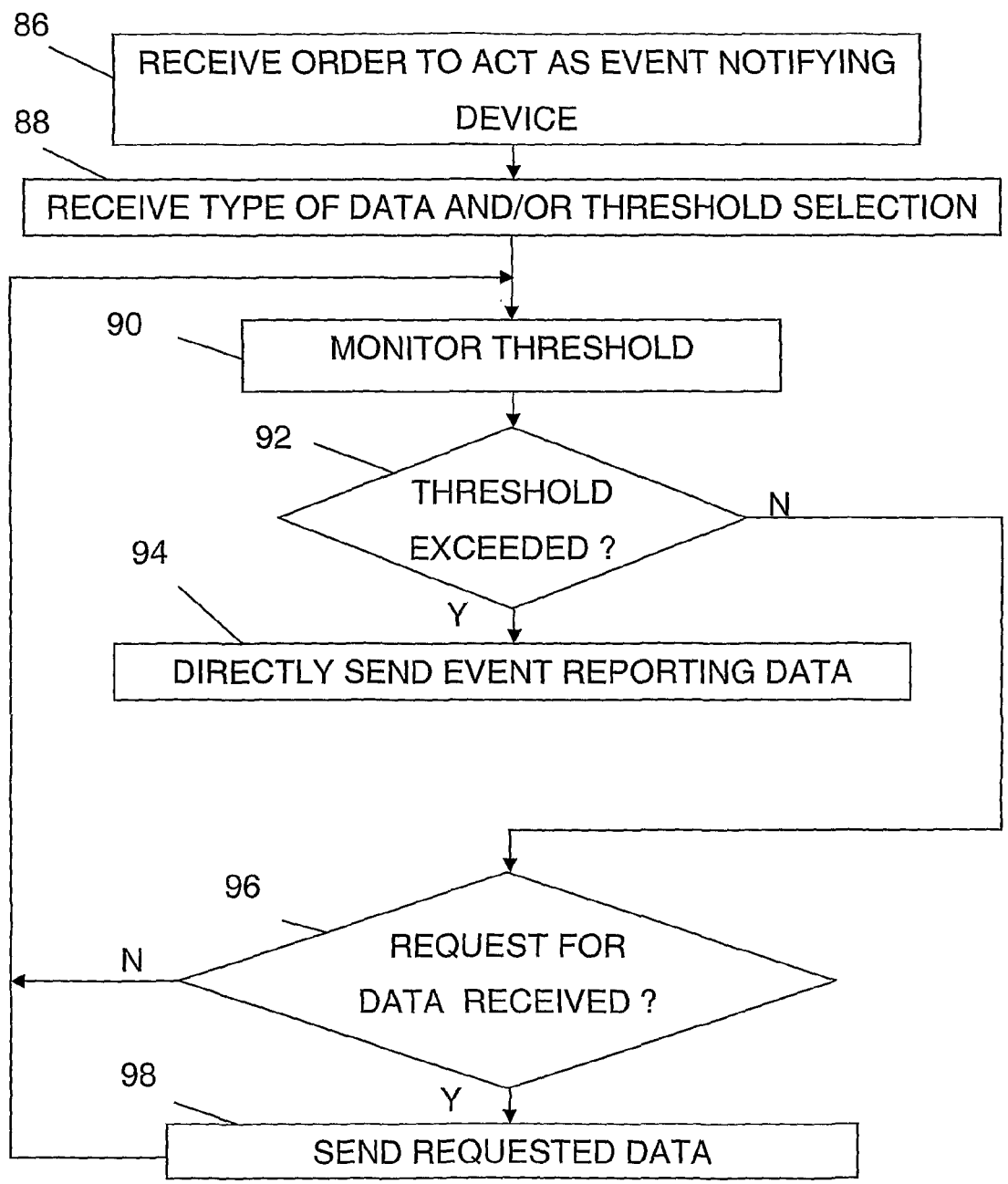
FIG. 7 shows a flow chart of a method provided in the event notifying device of FIG. 4, and FIG. 8 schematically shows a computer program product in the form of a CD Rom disc comprising computer program code for carrying out the invention.

Now the functioning of the invention according to an embodiment of the present invention will be described with reference being made to the previously described FIG. 1-4 as well as to FIG. 5, which shows a flow chart of method steps provided in the first end terminal, FIG. 6, which shows a flow chart of method steps provided in the server and FIG. 7, which shows a flow chart of method steps provided in the second end terminal.

It is initially assumed that all the end terminals are registered as a group. As mentioned above, this registration may be provided on another server or in an end terminal. For the sake of simplicity it is here assumed that this registration is made in the server 22 and then in the group store 32. Here it should also be realised that there may be other groups registered and these other groups may include one or several of the different end terminals. The different end terminals in the different groups may here engage in ordinary Push-to-talk sessions in line with the explanation made above. When floor has been granted for an end terminal in such an ordinary session, the end terminal in question may send half duplex media where a talk burst normally includes voice. A depression of a button on the end terminal releases the floor and lets other terminal in a session take over. It is here also possible for media to be sent to all other members of the group or only to one or a few members. This is all well known within the art and will therefore not be elaborated on any further.

According to the present invention, one of the end terminals, which is in control or owns the group, initiates a special session. In the present example this terminal is the first end terminal 12. The PoC client 40 of the first end terminal 12 here sends an initiation message to the terminal control unit 38, which in turn sends it to the server 22 via interface unit 36 and antenna 34. The initiation message sent to the server 22 then includes a special setting or selection of one of the end terminals to act as an event notifying device, step 46. The selection is here of the second end terminal 14 to act as an event notifying device. This is also the same as initiating an event driven POC session. The selection is here sent using a specialised SIP Invite request. Invite requests are specified in Open Mobile Alliance, "Push to talk over Cellular (PoC)—Architecture, Candidate Version 1.0-6 Oct. 2005, chapter 9. The request includes a service indication, which according to the invention is set to be the service of monitoring a device. The request will also include a setting of which device is being monitored or being set as an event notifying device.

According to the invention the first end terminal 12 may also select the type of data to be transmitted for notifying an event and/or threshold for detecting an event, step 48. In this embodiment there are only two types of data speech in the form of talk bursts and personal alerts. Personal alerts will be described later on. It should however be realised that other types of data are feasible, like video data, image data etc. A threshold is in this embodiment a sound pressure level dB that is used by a VOX application unit in detecting sound. Thus the PoC client 40 of the first end terminal 12 selects type of data to be used for reporting of an event, sound or personal alert, or a threshold. It is of course possible that a default report type and a default threshold is used. This setting is forwarded to the terminal control unit 38, which orders the interface unit 36 and antenna 34 to send it to the server 22, step 50.

The event notifying selection is received by the interface unit 24 of the server 22, step 62. The communication control unit 26 there sees that it is a PoC request and therefore makes the interface unit 24 forward this selection to the basic floor handling unit 28. The basic floor handling unit 28 looks at the service indication, notices that this indication indicates an event driven PoC session and therefore forwards the request to the enhanced floor control unit 30 for processing. The enhanced floor control unit 30 has a separate set of rules for these event notifying sessions. First of all it retrieves group information from the group store 32 for identifying which group the setting is related to. Once this has been done, it gives the end terminal 14 that is set as an event notifying device pre-emptive priority, i.e. when it sends data indicative of an event other end terminals of the group are immediately disallowed or barred from sending data. It also gives the selected end terminal 14 speak only priority, i.e. it is only allowed to submit data, but not receive. It also sets the priority for the event notifying session to have higher priority than any other sessions that might be ongoing. The invite request is then forwarded to all of the end terminals of the group, and all of them, except one, may enter the session at will. The second end terminal 14 that has been chosen to be event notifying device may have a setting to automatically be a part of the session. By making these settings and choosing the second end terminal 14 to be an automatic part of the session, the second end terminal 14 is being selected to act as an event notifying device, step 64. Thus here the first end terminal 12 has a setting of being an owner of the group and is also set as a watcher in the group. The third end terminal 16 is only set as a watcher in the group, while the second end terminal 14 is set to be an event notifying device.

The enhanced floor control unit 30 sets a pre-grant mechanism for the second end terminal 14, which means that this device need not to request the floor, but is automatically granted that and is prioritised in the sessions of the first group. The enhanced floor control unit 30 also sets other sessions involving end terminals in the group to have lower priority. It furthermore blocks any type of data transfer to the second end terminal 14. In this way it has set the second end terminal 14 to be an event notifying device.

The interface unit 24 of server 22 then receives the type of data and/or threshold selection, step 66, and the communication control unit 26 makes the interface unit 26 forward it to the enhanced floor control unit 30, which in turn forwards them to the event notifying device 14 for use in reporting events, step 68. It should here be noted that if the type of data selection is a personal alert, the enhanced floor control unit 30 might not forward this selection but keep it for itself and forward no such selection. It would then when the event notifying device reported an event using some data, replace that data with a personal alert. Thereafter the server 22 awaits the reception of an event notifier.

The second end terminal 14, which is now an event notifying device, thus receives this invitation via the antenna 34 and interface unit 36, step 86, and the control unit 38 forwards this invitation to the PoC client 42. The invitation is here actually an order to act as an event notifying device. The client 42 analyses the service indication, sees that it is an event notifying session, analyses the identifier of the device set as event notifying device. When doing this it sees that it has itself been selected to act as a device and therefore the client unit 42 activates an automatic participation of the session. The PoC client 42 furthermore activates the VOX unit 44 to monitor sound pressure levels picked up by a microphone. The type of data and/or threshold selection is then received by the antenna 34 and interface unit 36, step 88, and forwarded to the PoC client 42 by the control unit 38. The PoC client 42 here sets a certain type of data to be used when reporting according to the received selection, like audio or personal alerts. If a threshold is received it is forwarded to the VOX unit 44 for use in detecting an event. The PoC client 42 orders the VOX unit 44 to observe if sound is received that exceeds the threshold. If no threshold is received the VOX unit 44 applies a default threshold.

It should here be noted that the other end terminals that are part of the session may now communicate with each other according to ordinary PoC session rules. In this regard the third end terminal 16 may communicate with the first end terminal 12. It should also be noted that because of the speak only setting in the enhanced floor control unit 30 of the server 22, this communication is not picked up by the event notifying device 14. The other devices of the group may furthermore be involved in other sessions under the control of the basic floor control unit 28.

The VOX unit 44 of the event notifying device 14 thus monitors the threshold, step 90, and if the threshold is exceeded, step 92, it notifies the PoC client 42. The PoC client 42 then sends event reporting data or data indicative of the event, step 94, to the enhanced floor control unit 30 of the server 22. If the type is here voice, voice is picked up by the microphone of the event notifying device 14 and sent in a talk burst to the enhanced floor control unit 30 of the server 22. From the point of view of the server there is thus an event, step 70, and the enhanced floor control unit 30 receives the event reporting data. The enhanced floor control unit 30 then looks at the priority of the event notifying device 14, and sees that it has pre-emptive priority. It thus prioritises event reporting data, step 74, by stopping the sending of data by any of the other end terminals of the group. Here it also orders the basic floor control unit 28 to stop sending data to or from the watchers 12 and 16 of the group in other sessions. It may for instance block voice of others, block all data of others, block the data of the same type as that used for reporting the event etc. The enhanced floor control unit 30 then forwards the event reporting data to all other end terminals of the group, step 76.

As an event occurs, step 52, all other end terminals in the group, including the first end terminal 12, thus directly receive data reporting the event in the form of a talk burst, step 54, without a request for talk burst being sent by the event notifying device.

Above was described the sending of talk bursts. It is also possible that personal alerts are sent instead. Personal alerts are described in more detail in "Push to talk over Cellular (PoC)—Control Plane, Candidate Version 1.0-6 Oct. 2005, chapter 9.9. As mentioned before the personal alert may be provided directly by the event notifying device or the event notifying device sends a talk burst, which the server then replaces with a personal alert. The personal alert is then sent to all devices of the group that engage in the session. Thus the server ensures that data indicative of the event is transported to the other end terminals of the group, either by forwarding the data generated by the event notifying device or by replacing the data generated by the event notifying device with data kept by the server.

It is possible for the owner of the group and perhaps also for other end terminals to request the delivery of data from the event notifying device. This functionality may furthermore also be provided for other watchers of the group, for instance the third end terminal 16. If an event has not been notified, step 52, the first end terminal 12 may therefore send a request for data in order to see what has been happening in the event notifying device 14. If the first end terminal 12 decides to send a request for data, step 56, the request is sent through sending a PoC third party request of the floor to the server 22, where the request comprises an indication that data is wanted from the event notifying device 14, step 58, which may be a request for data of a certain type, like voice data, or video data.

Since no event has been notified, step 70, and data has been requested by the first end terminal 12, step 78, the request is then received by the server 22, which grants the request and returns a grant message to the first end terminal 12. It then goes on and orders the event notifying device 14 to send data, step 80.

In case the threshold was not exceed by the event notifying device 14, step 92, the PoC client unit 42 goes on and awaits a request to send data, step 96, If a request is received, step 96, it goes on and collects the requested data and sends it to the server 22, step 98, where the data may be of the same type as is used when notifying the event. The data can thus be recorded voice or video. Thereafter the event notifying device 14 goes back and monitors the threshold, step 90.

The data is then received by the server 22, step 82, and forwarded to all watchers of the group, step 84, or only to the watcher which requested it, whereupon the server 22 goes back and awaits an event notifier, step 70. The first end terminal 12 then receives the data, step 60, and may then see the status of the event notifying device 14. Thereafter it goes back and awaits notification of events, step 52.

If no request for data was sent or sending of data ordered, step 56 and 78, the first end terminal 12 and the server 22 both go back and await notification of an event, step 52, 70. Likewise the event notifying device 14, if no request for data is received goes back and monitors the threshold, step 90. In this way the end terminals of the group and the server continue to work with each other until the session is ended.

With the present invention it is possible to provide monitoring of many different types of events. In one embodiment the event notifying device is a baby watcher, which monitors if a baby is sleeping. In this case the two watchers may be the two parents of the baby. Here it may be possible to transmit the sound of the baby when a sound pressure level threshold is exceeded, which may take place when the baby is screaming. The data transmitted may then be sound. It is also possible that data transmitted is video, still or moving images or a personal alert. It can also be a PoC presence message or a POC instant message.

It is possible to use the present invention in other ways. It is possible to provide the event notifying device as a car alarm, which may be left in a car (hidden of course). The car driver, or some other person responsible for the car, will setup the event driven PoC group session which may include the parking garage supervisor, the identity of which is a SIP URL that may be found at the entrance and parking place.

When the event notifying device discovers some unauthorized action to the car, either by means of a (e.g. Bluetooth) connection to the car-alarm or a VOX unit, it will trigger a Personal Alert or media tone to the watcher(s). The personal alert should include the parking garage and the parking lot number in order for the parking garage supervisors to locate the car quickly. A presence update containing a GPS location could also be used. Another possible use is the use of temperature sensors, burglar alarms or movement triggers.

Apart from these interesting fields of application the invention furthermore has a number of other advantages. It provides fast event notification. It is flexible in that it allows any end terminal having the proper software to be set as an event notifying device. It is furthermore simple to operate for a user, since he only has to make a limited number of actions in order to activate the event notifying function. Once the function is initiated, the function can run without the user having to do anything else than observing his end terminal.

It should be realised that setting of data type and thresholds are not limited to being sent at the initiating of the session, but may be sent at any time during a session. It should also be realised that settings may be stored in the server, which when receiving event data of one type selects another type, like for instance selects a personal alert, selects sound when video is received or only moving images when video is received. Settings may also be provided from the owner of the group to the event notifying device without passing the PoC network, for instance by using a web page, like a Wireless Village web page.

Figure 8:
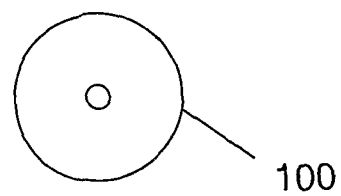

The present invention can be implemented through one or more processors together with computer program code for performing the functions of the invention. This is especially the case for the PoC client units, control units and the basic and enhanced floor control units. The interface units are normally provided as separate circuits for instance as ASIC circuits, whereas the group store can be provided as a suitable memory unit for instance in the form of hard disc, ROM, RAM etc. The program code mentioned above may also be provided as computer program product, for instance in the form of a data carrier carrying computer program code for performing the method according to the present invention when being loaded into the first end terminal and/or the first network server. One such carrier 100, in the form of a CD ROM disc is generally outlined in FIG. 8. It is however feasible with other data carriers such as a memory stick. The computer program code can furthermore be provided as pure program code on a server and downloaded to the server or an end terminal remotely.

There are several variations that are possible to make of the present invention. The group described above was a pre-set group. The group can also be an ad-hoc group created at the time the session is started. It is possible to use other types of thresholds than the one described. It may also be possible to continue the sessions of watchers if the data used to notify an event is different than the one used in a session. In case of a video session, then sound may be blocked for providing sound for indicating the event. It should also be realised that not all end terminals of a group may take part, it may for instance be only the owner of the group and the event notifying device. An event notifying device may be set by default. In this case the owner may only indicate the type of session when sending the initial invite message. Both the server and the second end terminal would then know that the second end terminal was an event notifying device in advance. Just through the server forwarding the invitation from to the first to the second end terminal, the second end terminal would know that it is to act as an event notifying device. The VOX unit was shown as provided outside the second end terminal. It may also be a part of this end terminal. The event notifying device may as an alternative request the floor before event reporting data is sent. Therefore the present invention is only to be limited by the following claims.

The invention claimed is:

1. A method of providing event-triggered communication in a half duplex communication environment provided in a wireless communication network for a group of end terminals including at least a first end terminal and a second end terminal and comprising the steps of:
   receiving a selection, from the first end terminal, of an end terminal of the group to act as an event notifying device; and
   allowing data indicative of an event to be directly sent from the event notifying device, wherein in the case of receiving data indicative of an event from the event notifying device, further comprising the steps of:
      prioritizing delivery of data indicative of the event over delivery of data from ongoing communication sessions for other end terminals of the group; and
      transporting data indicative of the event to other end terminals of the group, in order to inform them of the event;
   receiving from the first end terminal a selection of a type of data to be used as indicative of the event; and
   ensuring that data according to that type is supplied when providing data indicative of the event.

2. The method of claim 1, wherein the step of prioritizing comprises disallowing the transmission of said type of data for other end terminals in the group when the event notifying device provides data of said type associated with an event notifier.

3. The method of claim 1, further comprising the steps of:
   receiving a threshold to be used by the event notifying device in determining whether to send an event notifier from another end terminal in the group; and
   forwarding the threshold to the event notifying device.

4. A method of providing event-triggered communication in a half duplex communication environment provided in a wireless communication network for a group of end terminals including at least a first end terminal and a second end terminal and comprising the steps of:
   receiving an order to be an event notifying device in the group;

receiving a selection of a type of data to be transmitted with an event notifier;
comparing an event with a threshold; and
if the event exceeds said threshold:
   directly sending data indicative of the event to a half duplex communication handling server, so that the server may prioritize data indicative of the event from the event notifying device over ongoing communication sessions for other end terminals of the group and transport data indicative of the event to other end terminals of the group for informing them of the event, wherein sending data indicative of the event comprises sending media data according to a type indicated by the received selection.

5. The method of claim 4, further comprising the steps of:
receiving a request for data; and
providing such data to the server, for provision at least to an end terminal in the group that has requested it.

6. The method of claim 4, further comprising the steps of:
receiving a threshold to be used in determining when to send an event notifier; and
using said received threshold when comparing with the event.

7. A method of providing event-triggered communication in a half duplex communication environment of a wireless communication network for a group of end terminals including at least a first end terminal and a second end terminal and comprising the steps of:
sending a selection of a type of data that is indicative of an event;
sending, to a half duplex communication handling server, a selection of an end terminal of the group to act as an event notifying device, so that the server can allow data indicative of an event to be directly sent from the event notifying device and prioritize data from the event notifying device over ongoing communication sessions for other end terminals of the group; and
receiving data indicative of the event from the server, in order to be informed of the event, wherein receiving data indicative of the event comprises receiving data of a media type in accordance with the sent selection.

8. The method of claim 7, further comprising the steps of:
sending a request for data from the event notifying device to the server; and
receiving said data from the server.

9. The method of claim 7, further comprising the step of sending a threshold to be used by the event notifying device in determining whether to send an event notifier.

10. A server providing a half duplex communication environment in a wireless communication network for a group of end terminals including at least a first end terminal and a second end terminal and comprising:
a floor control unit arranged to:
   receive a selection, from the first end terminal, of an end terminal of the group to act as an event notifying device;
   receive a threshold to be used by the event notifying device in determining whether to send an event notifier from another end terminal in the group and forward the threshold to the event notifying device;
   allow data indicative of an event to be directly sent from the event notifying device, and being further arranged to, in case of receiving data indicative of an event from the event notifying device:
      prioritize delivery of data indicative of the event over delivery of data from ongoing communication sessions for other end terminals of the group; and
      order the transporting of data indicative of the event to other end terminals of the group, in order to inform them of the event.

11. The server of claim 10, wherein the floor control unit is further arranged to:
receive from the first end terminal a selection of a type of data to be transmitted with an event notifier; and
ensure that data according to that type is supplied to the first end terminal when providing data indicative of the event.

12. The server of claim 10, wherein the floor control unit when prioritizing is arranged to disallow the transmission of said type of data for other end terminals in the group when the event notifying device provides data of said type associated with an event notifier.

13. An end terminal provided in a half duplex communication environment of a wireless communication network for a group of end terminals including at least a first end terminal and a second end terminal and comprising a client unit arranged to:
receive an order to be an event notifying device in the group;
receive a selection of a type of data to be transmitted with an event notifier;
order the comparing of an event with a threshold; and
if the event exceeds said threshold:
   directly order the sending of data indicative of the event to a half duplex communication handling server, so that the server may prioritize data indicative of the event from the event notifying device over ongoing communication sessions for other end terminals of the group, and transport data indicative of the event to other devices of the group for informing them of the event, wherein sending of data indicative of the event comprises sending media data according to a type indicated by the received selection.

14. The end terminal of claim 13, wherein the client unit is further arranged to receive a request for data and provide such data to the server for provision to at least the end terminal in the group that has requested it.

15. The end terminal of claim 13, wherein the client unit is further arranged to receive a threshold to be used in determining when to send an event notifier and using said received threshold when comparing with the event.

16. An end terminal provided in a half duplex communication environment of a wireless communication network for a group of end terminals including at least a first end terminal and a second end terminal and comprising a client unit arranged to:
order the sending of a selection of a type of data that is indicative of an event;
order the sending, to a half duplex communication handling server, of a selection of an end terminal of the group to act as an event notifying device, so that the server can allow data indicative of an event to be directly sent from the event notifying device and prioritize data from the event notifying device over ongoing communication sessions for other end terminals of the group, and
receive data indicative of the event from the server, in order to be informed of the event, wherein receiving data indicative of the event comprises receiving data of a media type according to the sent selection.

17. The end terminal of claim 16, wherein the control unit is further arranged to order the sending of a request for data from the event notifying device to the server and receive said data from the server.

18. The end terminal of claim 16, wherein the client unit is further arranged to order the sending of a threshold to be used by the event notifying device in determining whether to send an event notifier.

* * * * *